(12) United States Patent
Mayaji et al.

(10) Patent No.: US 7,839,029 B2
(45) Date of Patent: Nov. 23, 2010

(54) LINEAR MOTOR

(75) Inventors: Masashi Mayaji, Aichi (JP); Yoichi Kawai, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 11/749,337

(22) Filed: May 16, 2007

(65) Prior Publication Data

US 2008/0001481 A1 Jan. 3, 2008

(30) Foreign Application Priority Data

May 23, 2006 (JP) ............................. 2006-143015

(51) Int. Cl.
*H02K 41/00* (2006.01)
*H02K 41/02* (2006.01)
*H02K 41/03* (2006.01)
(52) U.S. Cl. ................... 310/12.01; 310/12.25; 310/13; 310/14; 310/15
(58) Field of Classification Search .................... 310/12, 310/12.01, 12.25; *H02K 41/00, 41/02, 41/03*
See application file for complete search history.

(56) References Cited

U.S. PATENT DOCUMENTS

| | | | | |
|---|---|---|---|---|
| 1,859,764 A | * | 5/1932 | Bougon | 310/12.25 |
| 4,870,306 A | * | 9/1989 | Petersen | 310/12 |
| 4,945,268 A | * | 7/1990 | Nihei et al. | 310/12.22 |
| 5,032,746 A | * | 7/1991 | Ueda et al. | 310/12.13 |
| 5,218,250 A | * | 6/1993 | Nakagawa | 310/12.21 |
| 5,235,226 A | * | 8/1993 | Olsen et al. | 310/12.11 |
| 5,302,873 A | * | 4/1994 | Takei | 310/12 |
| 5,854,521 A | * | 12/1998 | Nolle | 310/216.004 |
| 6,633,217 B2 | * | 10/2003 | Post | 335/306 |
| 2006/0076839 A1 | * | 4/2006 | Kawai | 310/12 |
| 2006/0125326 A1 | * | 6/2006 | Baccini | 310/12 |
| 2008/0001481 A1 | * | 1/2008 | Miyaji et al. | 310/12 |

FOREIGN PATENT DOCUMENTS

| | | | |
|---|---|---|---|
| JP | 06189519 A | * | 7/1994 |
| JP | 2005137140 | | 5/2005 |

OTHER PUBLICATIONS

JP 06189519_EN.pdf : English Translation of Ishibashi (JP 06189519).*

* cited by examiner

*Primary Examiner*—Quyen Leung
*Assistant Examiner*—John K Kim
(74) *Attorney, Agent, or Firm*—Gauthier & Connors LLP (57) ABSTRACT

In a linear motor, the stators and sliders are arranged to fill a predetermined relationship. In one configuration, two stators each include a plurality of stator blocks arranged in a moving direction of sliders so that projecting poles are maintained at predetermined intervals. Boundary surfaces are formed in adjacent stator blocks so as to be displaced relative to one another between the two opposite blocks by a distance Ld in the moving direction of the sliders. When a distance between end surface of the slider blocks is defined as L and the overall length of one stator block is defined as L0, the components are arranged such that Ld>L/3 and (L0−Ld)>L/3.

12 Claims, 11 Drawing Sheets

(PRIOR ART)

(PRIOR ART)

LINEAR MOTOR

CROSS-REFERENCE TO RELATED APPLICATIONS

This application is based on and claims priority under 35 USC 119 from Japanese Patent Application No. 2006-143015 filed on May 23, 2006.

BACKGROUND

1. Field of the Invention

The present invention relates to linear motors for use in industrial devices such as machine tools.

2. Description of the Related Art

In industrial devices such as machine tools, linear motors are used as a means for realizing high speeds and high accuracies. Japanese Patent Laid-Open Publication No. 2005-137140 discloses a linear motor for a machine with a long stroke in which the permanent magnets, which are expensive, are included in a slider, thereby reducing the amount of permanent magnet used in, and thus the cost of, the motor.

SUMMARY

A linear motor in accordance with one aspect of the present invention comprises two stators each having projecting poles arranged on opposite surfaces thereof at predetermined intervals, the stators extending parallel to each other, three types of slider blocks acting as magnetic poles for three phases on the basis of AC windings for three phases, and an slider having permanent magnets arranged on two surfaces of each of the slider blocks which are opposite the two stators so as to provide alternate polarities, the slider being movable between the two stators along an extending direction of the stators. The two stators each comprise a plurality of stator blocks arranged in the moving direction of the sliders so that the projecting poles are maintained at predetermined intervals. Boundary surfaces are formed in adjacent stator blocks so as to be displaced relative to one another between the two opposite blocks by a distance Ld in the moving direction of the sliders. When a distance between end surface of the slider blocks is defined as L, and the overall length of one stator block is defined as L0, the components are arranged such that $Ld>L/3$ and $(L0-Ld)>L/3$.

A linear motor in accordance with another aspect of the present invention comprises two stators each having projecting poles arranged on opposite surfaces thereof at predetermined intervals, the stators extending parallel to each other, three types of slider blocks acting as magnetic poles for three phases on the basis of AC windings for three phases, and an slider having permanent magnets arranged on two surfaces of each of the slider blocks which are opposite the two stators so as to provide alternate polarities, the slider being movable between the two stators along an extending direction of the stators. The two stators each comprise a plurality of stator blocks arranged in the moving direction of the sliders so that the projecting poles are maintained at predetermined intervals. Each of the stator blocks is further divided into two segments in a direction perpendicular to the moving direction of the sliders. Boundary surfaces formed in two adjacent stator block segments are displaced relative to one another between the adjacent segments by a distance Ld in the moving direction of the sliders. When a distance between end surface of the slider blocks is defined as L, and the overall length of one stator block segment is defined as L0, the components are arranged such that $Ld>L/3$ and $(L0-Ld)>L/3$.

A linear motor in accordance with yet another aspect of the present invention comprises a stator having projecting poles arranged along a straight line at predetermined intervals, three types of slider teeth located opposite the projecting poles and acting as magnetic poles for three phases on the basis of AC windings for three phases, and an slider having permanent magnets arranged on a surface of each of the slider teeth which is opposite the stator so as to provide alternate polarities, the slider being movable along an extending direction of the stator. The stator comprises a plurality of stator blocks arranged in the moving direction of the sliders so that the projecting poles are maintained at predetermined intervals. Each of the stator blocks is further divided into two segments in a direction perpendicular to the moving direction of the sliders. Boundary surfaces formed in two adjacent stator block segments are displaced relative to one another between the adjacent segments by a distance Ld in the moving direction of the sliders. When a distance between end surface of the slider blocks is defined as L, and the overall length of one stator block segment is defined as L0, the components are arranged such that $Ld>L/3$ and $(L0-Ld)>L/3$.

A linear motor in accordance with a still further aspect of the present invention comprises two stators each having projecting poles arranged on opposite surfaces thereof at predetermined intervals, the stators extending parallel to each other, three types of slider blocks acting as magnetic poles for three phases on the basis of AC windings for three phases, and an slider having permanent magnets arranged on two surfaces of each of the slider blocks which are opposite the two stators so as to provide alternate polarities, the slider being movable between the two stators along an extending direction of the stators. The two stators each comprise a plurality of stator blocks having different lengths and arranged in the moving direction of the sliders so that the projecting poles are maintained at predetermined intervals. When a minimum value for a distance between boundary surfaces formed in stator blocks is defined as Ld, and a distance between end surfaces of the slider blocks is defined as L, the components are arranged such that $Ld>L/3$.

A linear motor in accordance with an aspect of the present invention comprises two stators each having projecting poles arranged on opposite surfaces thereof at predetermined intervals, the stators extending parallel to each other, three types of slider blocks acting as magnetic poles for three phases on the basis of AC windings for three phases, and an slider having permanent magnets arranged on two surfaces of each of the slider blocks which are opposite the two stators so as to provide alternate polarities, the slider being movable between the two stators along an extending direction of the stators. The two stators each comprise a plurality of stator blocks arranged in the moving direction of the sliders so that the projecting poles are maintained at predetermined intervals. Each of the stator blocks is further divided into two segments in a direction perpendicular to the moving direction of the sliders. The two stator block segments have different lengths When a minimum value for a distance between boundary surfaces formed in stator blocks is defined as Ld, and a distance between end surfaces of the slider blocks is defined as L, the components are arranged such that $Ld>L/3$.

A linear motor in accordance with an aspect of the present invention comprises a stator having projecting poles arranged along a straight line at predetermined intervals, three types of slider teeth located opposite the projecting poles and acting as magnetic poles for three phases on the basis of AC windings for three phases, and an slider having permanent magnets arranged on a surface of each of the slider teeth which is opposite the stator so as to provide alternate polarities, the slider being movable along an extending direction of the stator. The stator comprises a plurality of stator blocks arranged in the moving direction of the sliders so that the projecting poles are maintained at predetermined intervals. Each of the stator blocks is further divided into two segments in a direction perpendicular to the moving direction of the sliders. The two stator block segments have different lengths. When a minimum value for a distance between boundary surfaces formed in stator blocks is defined as Ld, and a distance between end surfaces of the slider blocks is defined as L, the components are arranged such that Ld>L/3.

DESCRIPTION OF THE PREFERRED EMBODIMENTS

Figure 3:
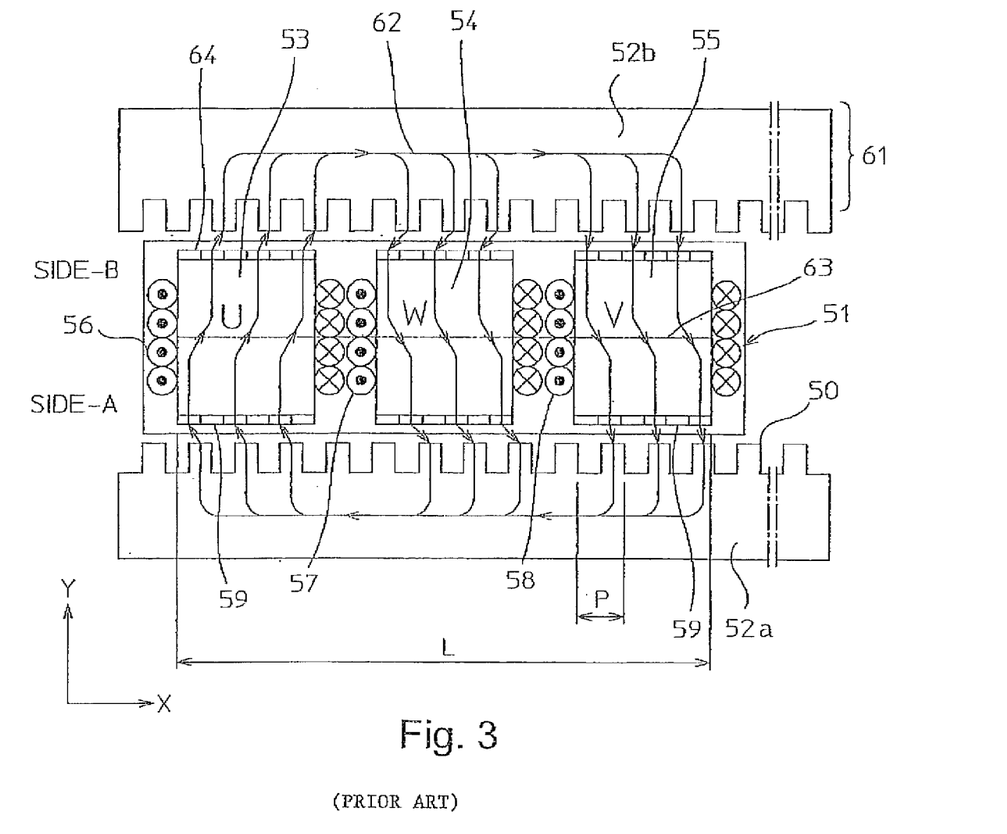
FIG. 3 is a diagram schematically showing the basic structure of the linear motor.
Figure 4:
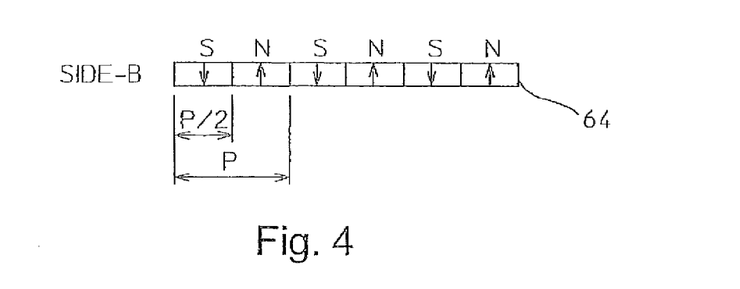
FIG. 4 is a diagram showing how permanent magnets are arranged on a surface of an slider block.
Figure 5:
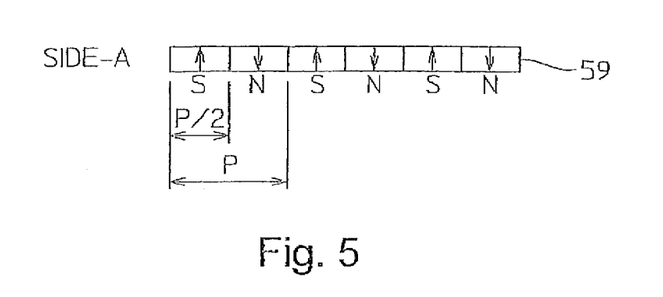
FIG. 5 is a diagram showing how the permanent magnets are arranged on the surface of the slider block.

FIG. 3 shows the basic configuration of a linear motor. The linear motor is composed of an slider 51 having permanent magnets 59 and 64 arranged in a moving direction and stators 52a and 52b formed by stacking electromagnetic steel plates. The stators 52a and 52b are fixed to, for example, a bed of a machine tool and each have projecting poles 50 formed at a pitch P so as to project from a stator magnetic yoke 61. The stator 52a is displaced from the stator 52b by a pitch P/2 corresponding to an electrical angle of 180° in an X axis direction shown in the figure. The slider 51 is fixed to, for example, a table of the machine tool. The table is supported so as to be movable in the X axis direction of FIG. 3 by a rolling guide or the like provided between the bed and the table. Rotator blocks 53, 54, and 55 are formed by stacking electromagnetic steel plates in order to reduce a core loss resulting from a change in magnetic flux. The slider blocks 53, 54, and 55 in a U phase, a V phase, and a W phase, respectively, are displaced relative to one another by 120° in the X axis direction, the direction in which slider 51 advances, that is, by a third of the magnetic pole pitch P of the stators 52a and 52b, corresponding to an electrical angle of 120°. AC windings 56, 57, and 58 in the U, V, and W phases are wound around the slider blocks 53, 54, and 55, respectively. The permanent magnets 59 and 64 are alternately arranged on an slider block surface of the slider 51 in order of S and N. As shown in FIGS. 4 and 5, the permanent magnets 59 and 64 are arranged at a pitch P so as to constitute pairs of permanent magnets S and N.

Figure 6:
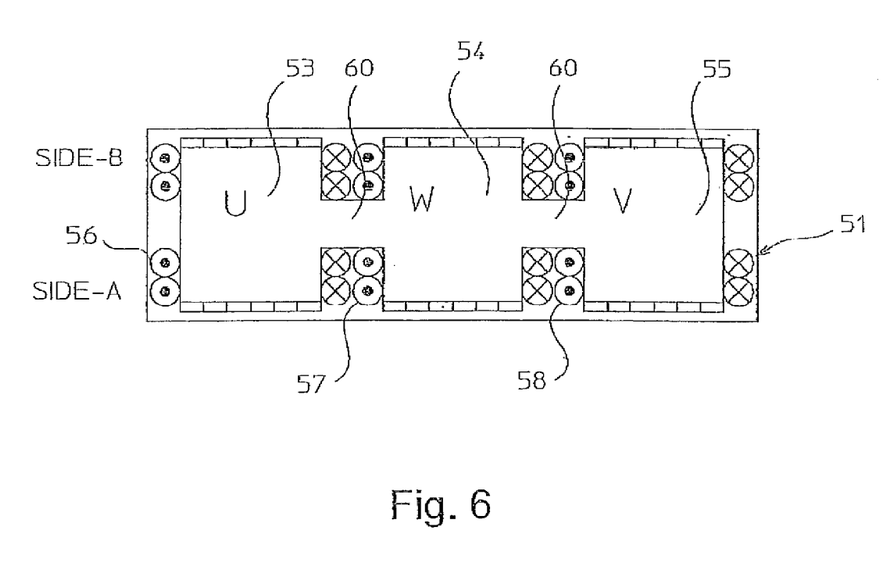
FIG. 6 is a diagram schematically showing the configuration of an slider in the linear motor.

When a current is applied to the AC windings 56, 57, and 58 in a direction from U to V and W, that is, when a current is passed through the AC winding 56 in an illustrated winding direction, while a current is passed through the AC winding 57 and 58 in a direction opposite to the illustrated winding direction, this configuration enhances magnetic flux from those of the permanent magnets 59 and 64 which are located in the same magnetic direction as that in which the AC windings are excited, and weakens magnetic flux from the remaining permanent magnets, those located in a magnetic direction opposite to the exciting direction. In FIG. 3, the slider block 53 is excited so that a SIDE-A acts as an S pole, while a SIDE-B acts as an N pole. In contrast, the slider blocks 54 and 55 are excited so that the SIDE-A acts as an N pole, while the SIDE-B acts as an S pole. This result in a magnetic path 62 passing through the slider blocks 53, 54, and 55 and the stators 52a and 52b, as shown in FIG. 3. Then, a magnetically attractive force acts in the same X axis direction on both the SIDE-A and SIDE-B of the slider 51, generating a thrust. Even when magnetic couplings 60 are provided between the three slider blocks 53, 54, and 55 as shown in FIG. 6, the density of magnetic fluxes generated by the N and S poles is the same on both the SIDE-A and SIDE-B of the same slider block, resulting in a magnetic balance. This minimizes the leakage of magnetic flux to the adjacent slider block, greatly reducing the possibility of a decrease in thrust.

Further, with this linear motor, a movable range with a long stroke can be provided simply by repeatedly arranging stator blocks having a simple structure formed by stacking inexpensive electromagnetic steel plates. Moreover, the expensive permanent magnets 59 and 64 may be located on the slider 51 in order to reduce the amount of permanent magnet required in, and thus the manufacturing cost of, the linear motor.

Figure 8:
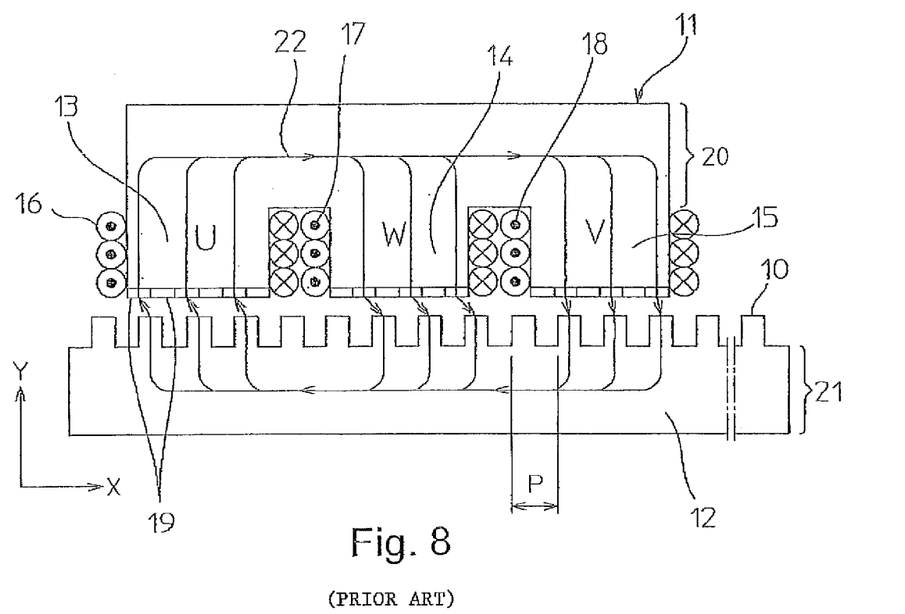
FIG. 8 is a diagram schematically showing the basic structure of a linear motor.
Figure 9:
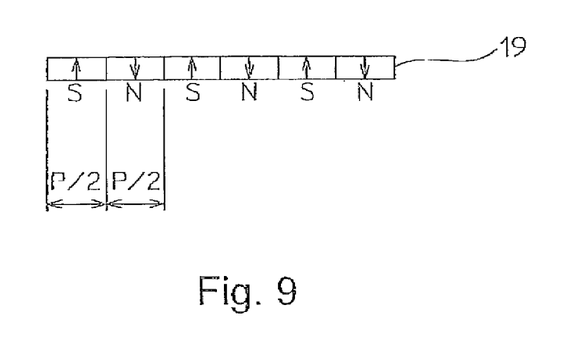
FIG. 9 is a diagram showing how permanent magnets are arranged on a surface of a tooth.

FIG. 8 is a diagram showing the basic configuration of a linear motor which differs from that shown in FIG. 3. In the motor shown in FIG. 8, a stator 12 is formed by, for example, stacking electromagnetic steel plates, with projecting poles 10 arranged on its surface at a pitch P so as to project from a stator magnetic yoke 21. Like the stator 12, an slider 11 is formed by, for example, stacking electromagnetic steel plates, and has teeth 13, 14, and 15 in a U phase, a V phase, and a W phase, respectively. The three teeth 13, 14, and 15 are displaced relative to the projecting poles 10 by P/3 corresponding to an electrical angle of 120° in the X axis direction. AC windings 16, 17, and 18 in the U, V, and W phases are wound around the teeth 13, 14, and 15, respectively. Permanent magnets 19 are alternately arranged on a teeth surface of the slider 11 in order of S and N. The permanent magnets 59 and 64 are arranged at a pitch P so as to constitute pairs of permanent magnets S and N as shown in FIG. 9. FIG. 8 shows a magnetic path 22 on which a current is applied to the AC windings 16, 17, and 18 in the direction from U to V and W. As with the linear motor shown in FIG. 3, this configuration enhances magnetic flux from the permanent magnets 19 which are located in the same magnetic direction as that in which the AC windings 16, 17, and 18 are excited, and weakens magnetic flux from the remaining permanent magnets, those located in a magnetic direction opposite the exciting direction. This excites each of the teeth 13, 14, and 15 as one magnetic pole, forming a large magnetic path 22 covering the entire slider 11. Then, a magnetically attractive force acts in the X axis direction on the side of the slider 11 which is closer to the stator 12, generating a thrust. As with the conventional linear motor shown in FIG. 3, with the conventional linear motor shown in FIG. 8, a movable range with a long stroke can be provided simply by repeatedly arranging stator blocks having a simple structure formed by stacking inexpensive electromagnetic steel plates. Moreover, the permanent magnets 19, which are expensive, may be located on the slider, to thereby reduce the amount of permanent magnet required in, and thus the manufacturing cost of, the linear motor.

Figure 7:
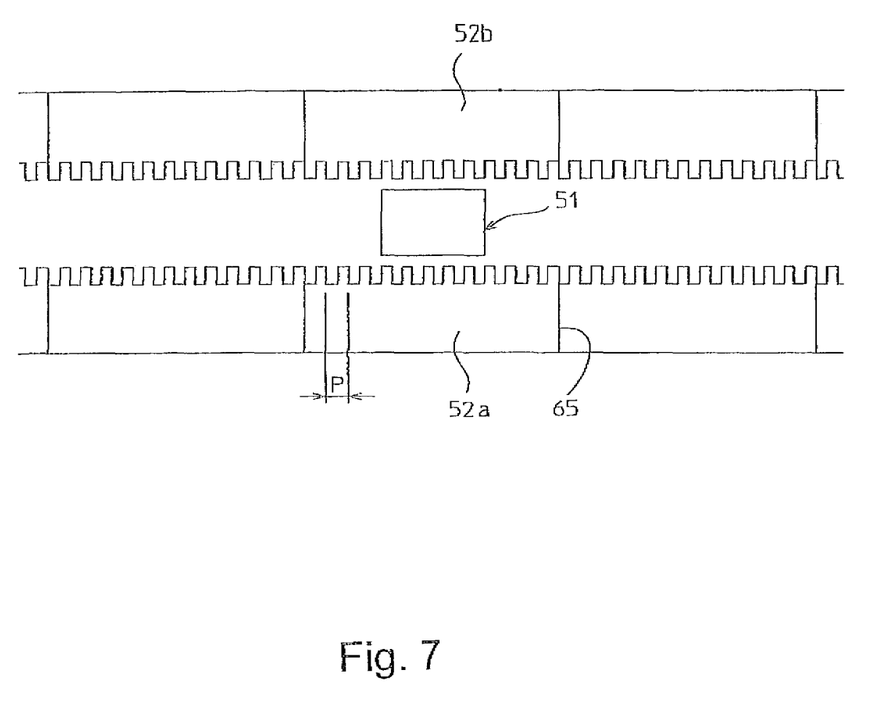
FIG. 7 is a diagram showing the arrangement of stators in the linear motor.
Figure 10:
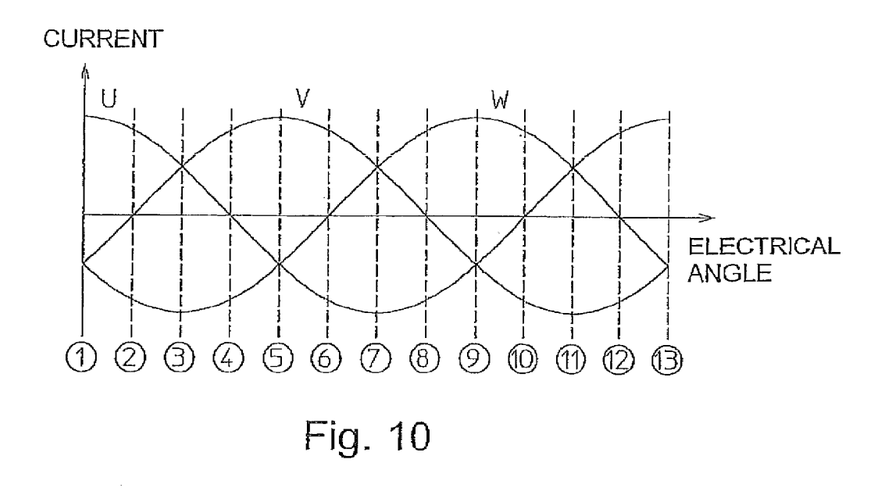
FIG. 10 is a diagram showing a current flowing through AC windings for three phases.

These liner motors pose the following problems. In FIGS. 3 and 8, while the sliders 51 and 11 move by the pitch P, ACs for three phases applied to the AC windings 56, 57, and 58 or 16, 17, and 18 vary as shown in FIG. 10. This significantly varies the magnetic paths 62 and 22 generated in the slider blocks 53, 54, and 55 and stators 52a, 52b and in the teeth 13, 14, and 15 and stator 12. On the other hand, if the stator blocks are arranged in the moving direction of the sliders as shown in FIG. 7, when a void is present in the boundary surface 65 between the stator blocks, the void offers a higher magnetic resistance than the interior of the electromagnetic steel plates of the stator blocks. Consequently, the amount of magnetic flux generated in the linear motor varies depending on whether or not movement of a slider generates a magnetic path which crosses the boundary surface 65; this results in a thrust ripple.

Figure 11:
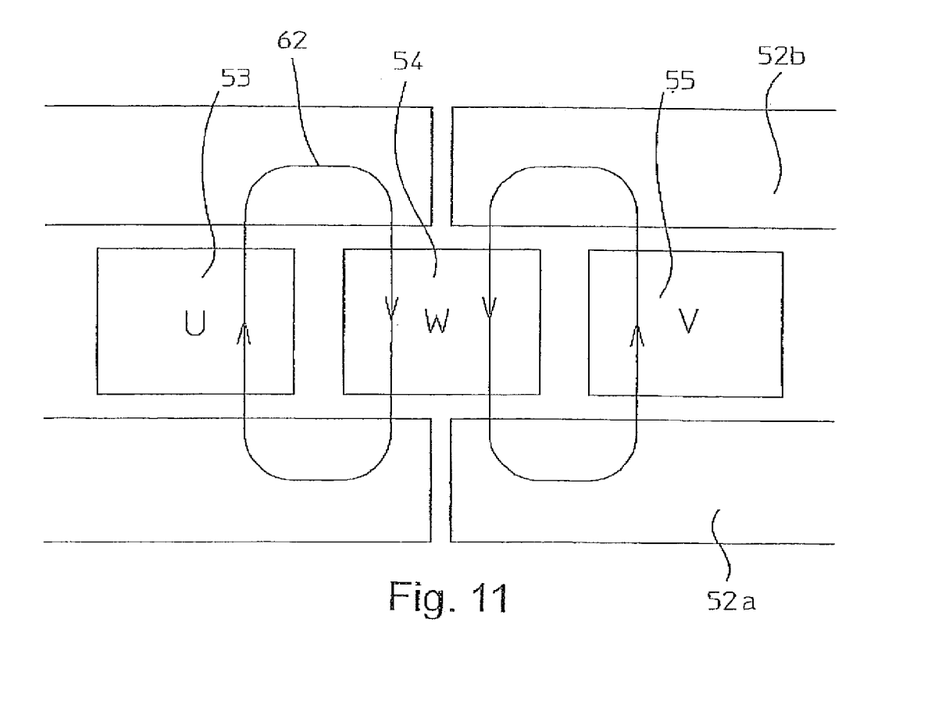
FIG. 11 is a diagram showing magnetic fluxes observed when a current is applied in a direction U, V→W.
Figure 12:
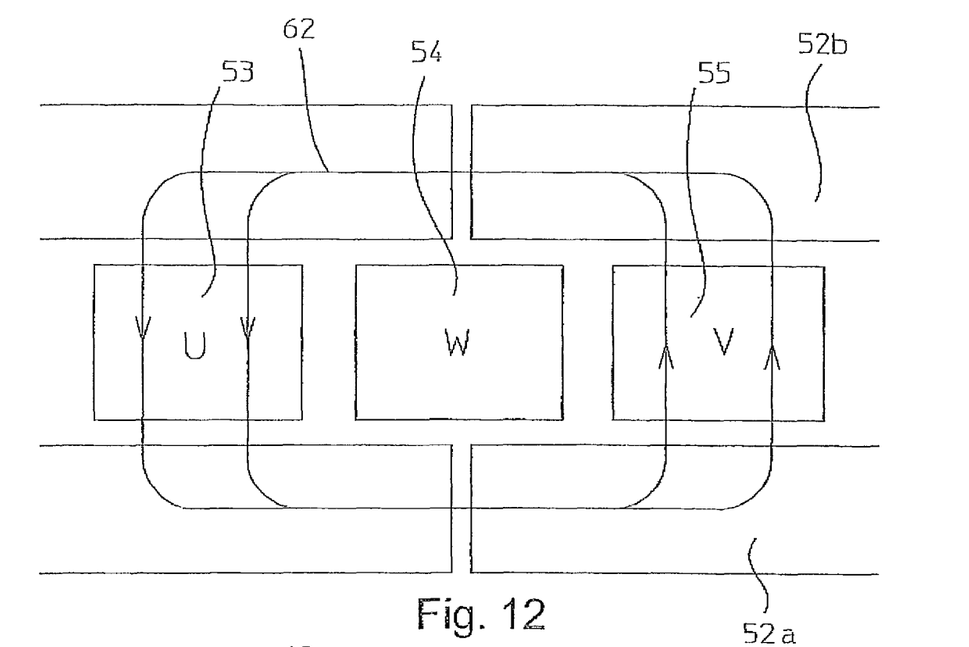
FIG. 12 is a diagram showing magnetic fluxes observed when a current is applied in a direction V→U.
Figure 13:
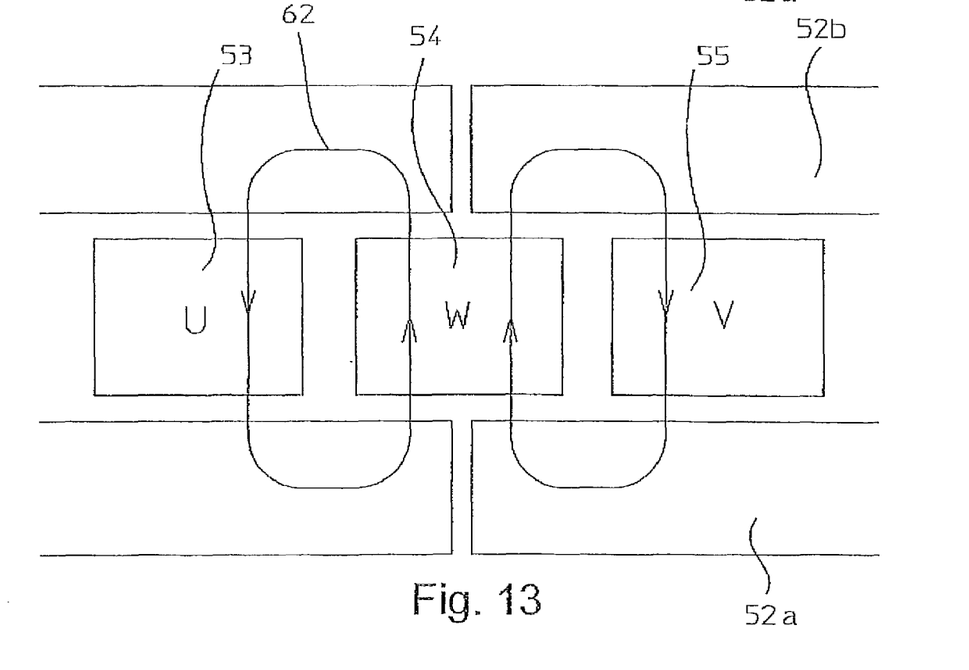
FIG. 13 is a diagram showing magnetic fluxes observed when a current is applied in a direction W→U, V.
Figure 14:
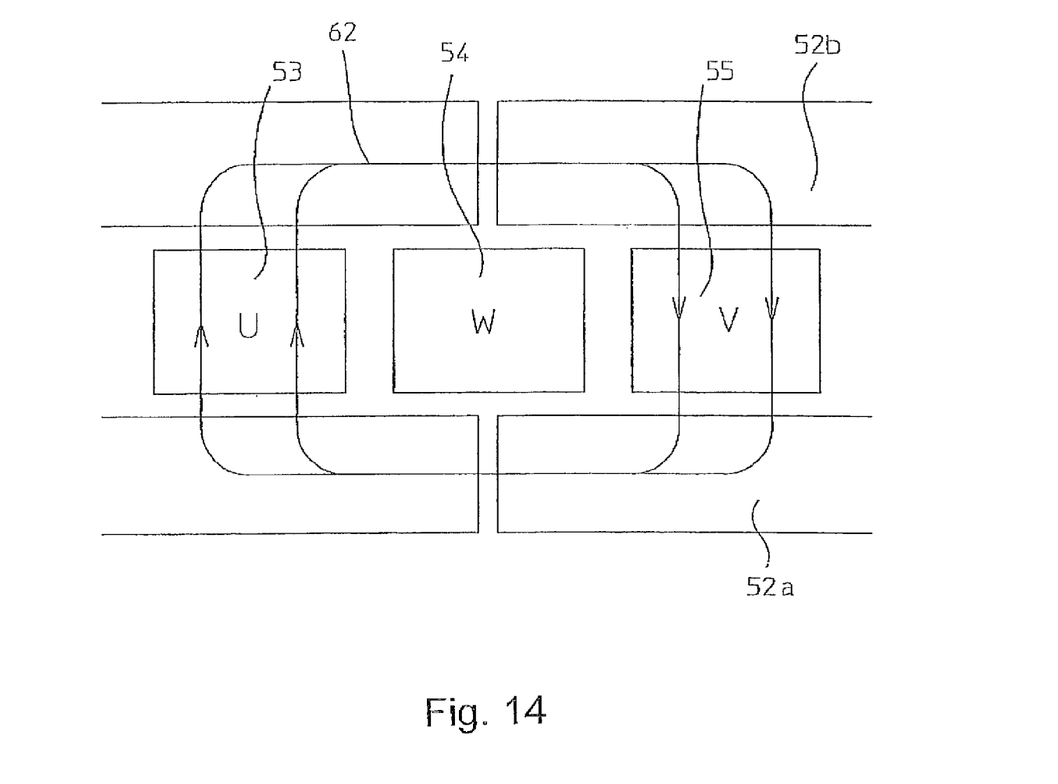
FIG. 14 is a diagram showing magnetic fluxes observed when a current is applied in a direction U→V.

Description will be given of a mechanism that generates a thrust ripple. FIGS. 11 to 14 show that a stator block boundary surface is present close to the center of the W phase slider block 54 in FIG. 3. The figures show the stators 52a and 52b and slider blocks 53, 54, and 55, shown in FIG. 3. The components which are the same as those in FIG. 3 are omitted for simplification. Moving the sliders by the pitch P varies the directions of the currents applied to the AC windings 56, 57, and 58 in the following order as shown in FIG. 10: (1) U→V, W, (2) U→W, (3) U, V→W, (4) V→W, (5), V→W, U, (6) V→U, (7) V, W→U, (8) W→U, (9) W→U, V, (10) W→V, (11) W, U→V, (12) U→V, and (13) U→V, W. For example, in a condition (3), the magnetic path 62 is generated so as to avoid the boundary surfaces as shown in FIG. 11, outputting a desired thrust. However, when the process shifts to a condition (6), the magnetic path 62 completely crosses the boundary surface as shown in FIG. 12, minimizing the thrust. Subsequently, when the process shifts to a condition (9), the magnetic path 62 is generated so as to avoid the boundary surfaces again as shown in FIG. 13, outputting the desired thrust. In a condition (12), the magnetic path 62 completely crosses the boundary surface as shown in FIG. 14, minimizing the thrust. Thus, while the slider moves by the pitch P, the thrust lowers twice to generate a thrust ripple at a pitch P/2. The thrust ripple at the pitch P/2 is generated by the crossing between the magnetic path 62 and the boundary surface. Accordingly, even if the conventional common stators and sliders are skewed relative to the moving direction of the sliders by the pitch P/2, the phenomenon in which the magnetic path 62 crosses the boundary surface cannot be avoided. This prevents the thrust ripple from being removed.

First Embodiment

Embodiments of the present invention will be described with reference to the drawings.

Figure 1A:
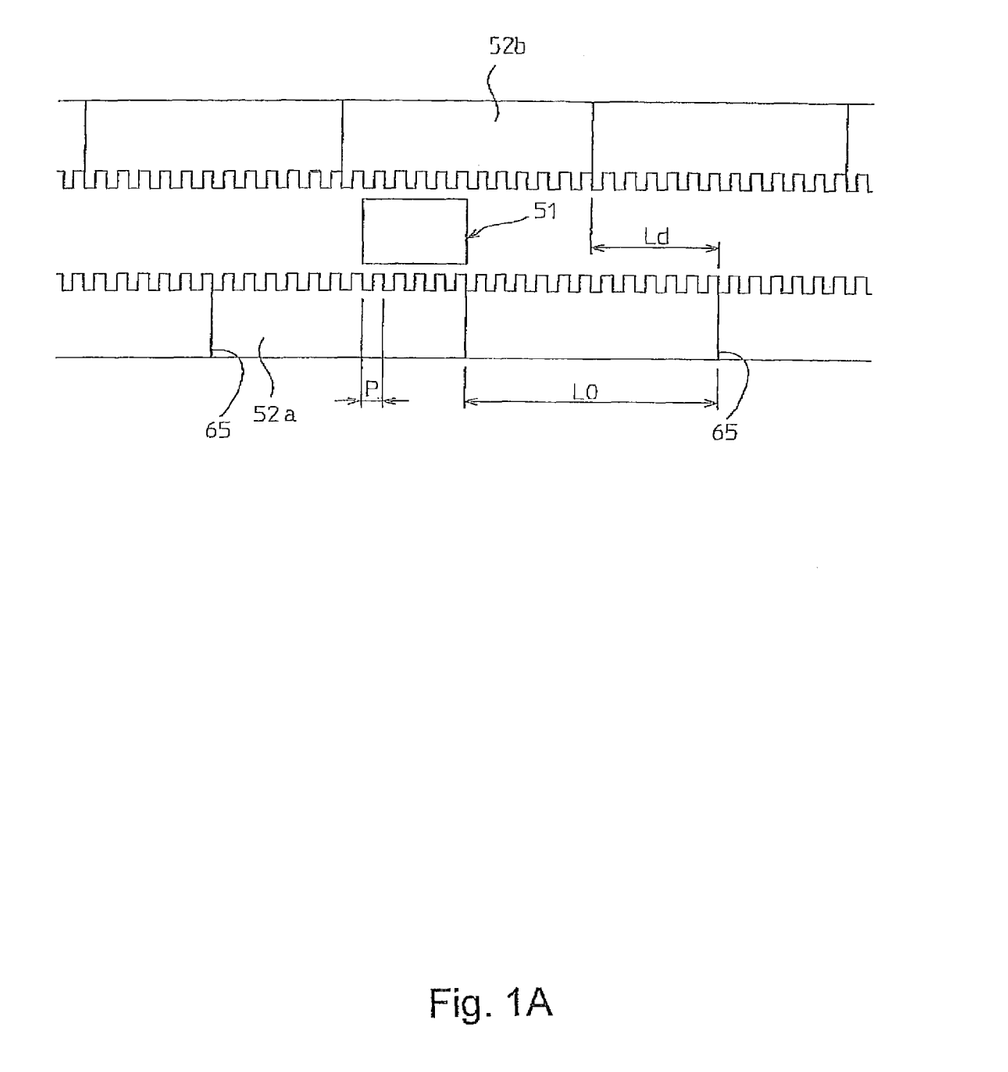
FIG. 1A is a diagram showing Embodiment 1 of a linear motor in accordance with the present invention.

FIG. 1A is a diagram showing a linear motor in accordance with a first embodiment. An slider 51 has a structure similar to that shown in FIG. 3. Slider blocks for a U phase, a V phase, and a W phase constituting the slider 51 are arranged so as to maintain a distance L between the end surfaces of the slider blocks. On the other hand, stators 52a and 52b are composed of stator blocks each of length L0 and have projecting poles arranged on their opposite surfaces at predetermined intervals. The stators 52a and 52b are arranged in a moving direction of the slider. Boundary surfaces 65 are formed between the stator blocks so that the boundary surfaces 65 in the stator 52a are displaced relative to the boundary surfaces 65 in the stator 52b by Ld in the moving direction of the slider 51. For the distance L between the end surfaces of the slider blocks, the overall length L0 of the stator block, and the distance Ld between the boundary surfaces, when Ld>L and (L0−Ld)>L, a magnetic path 62 crosses the boundary surface 65 twice, once in the stator 52a and once in the stator 52b in FIGS. 12 and 14, in which the magnetic flux amount is minimized. However, when Ld>L and (L0−Ld)>L, the magnetic path 62 crosses the boundary surface 65 only once in the stator 52b. This theoretically reduces the rate of decrease in magnetic flux by half, and thus the thrust ripple by half.

A detailed description will be given of Ld, L, L0, and the magnitude of a thrust ripple. (1) For Ld<L/3 and (L0−Ld)<L/3, the number of crossings between the boundary surface 65 and the magnetic path 62 is the same as that obtained when the boundary surfaces are not displaced relative to one another between the stators. Consequently, displacing the boundary surfaces 65 relative to one another exerts no effect. The maximum amplitude of the thrust ripple is the same as that of the conventional linear motor. On the other hand, (2) for L>Ld>L/3 and L>(L0−Ld)>L/3, the magnetic path 62 is partly formed so as not to cross the boundary surface 65. This reduces the decrease in the total amount of magnetic flux further compared to Case (1) where the magnetic path 62 crosses the boundary surface 65 twice. This in turn enables the maximum amplitude of the thrust ripple to be set lower than that of the conventional linear motor. Moreover, (3) for Ld>L and (L0−Ld)>L, the magnetic path 62 crosses the boundary surface 65 at most once. This reduces the maximum amplitude of the thrust ripple to as low as the half of that of the conventional linear motor.

Figure 1B:
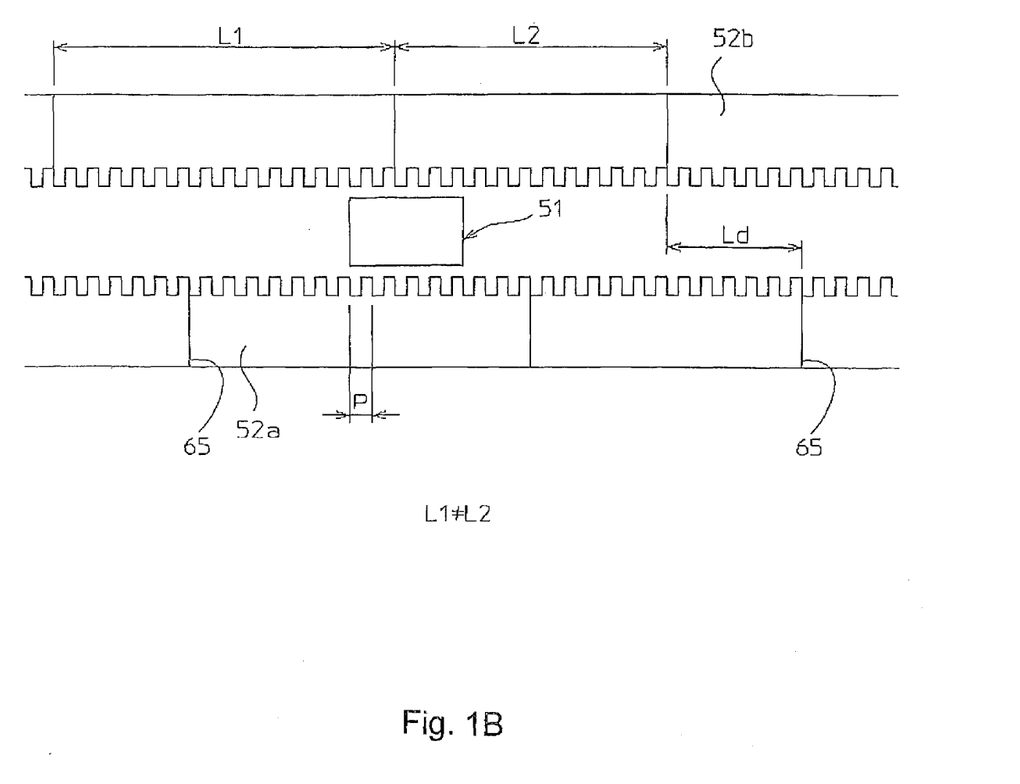
FIG. 1B shows an alternative diagram of a linear motor in accordance with a first embodiment.

FIG. 1B shows, an alternative diagram of a linear motor in accordance with a first embodiment. Here, the stators are shown with stator blocks of different length L1 and L2, where L1≠L2.

Second Embodiment

Figure 2A:
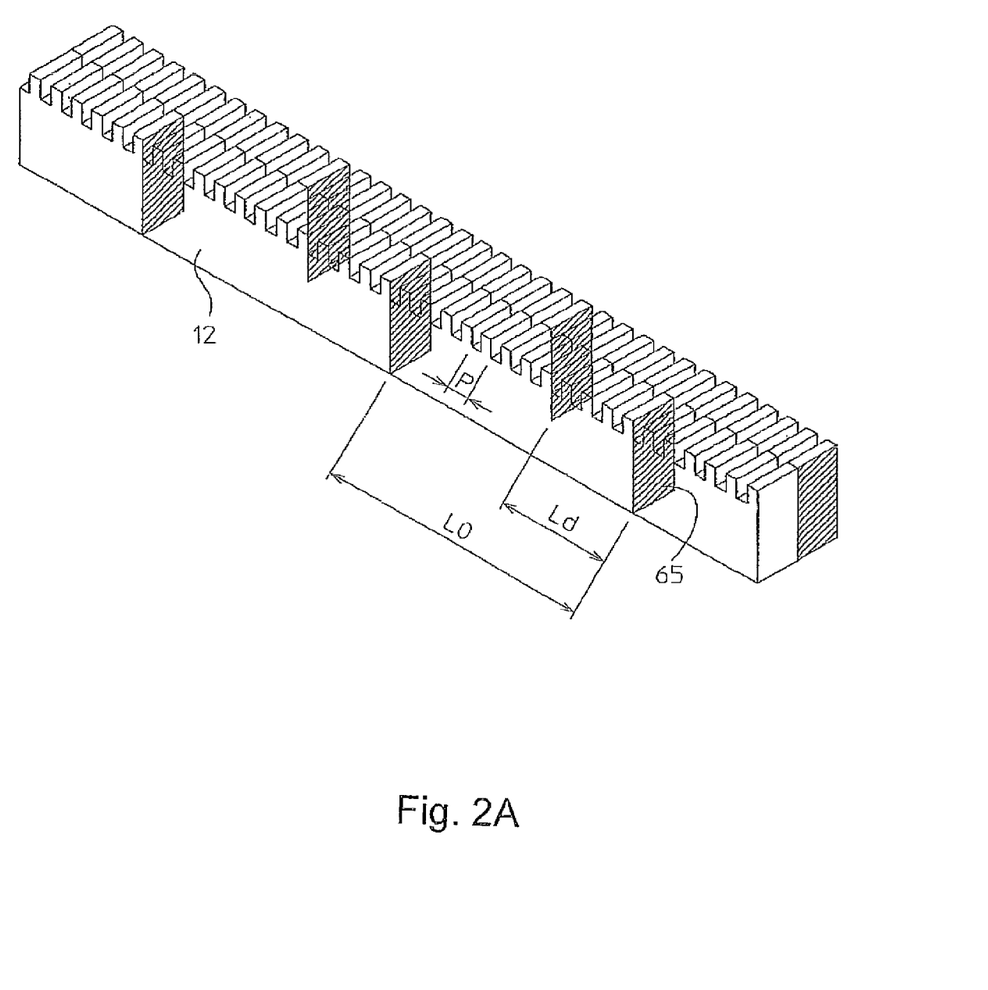
FIG. 2A is a diagram showing Embodiment 2 of the linear motor in accordance with the present invention.

FIG. 2A is a diagram showing a linear motor in accordance with a second embodiment of the present invention. A stator 12 has projecting poles arranged at predetermined intervals. Boundary surfaces 65 in stator blocks constituting the stator 12 is divided into two stages that are displaced relative to each other by Ld in the moving direction (direction in which the stator 12 extends) of an slider (not shown). The stator 12 having the stator blocks located adjacent to each other replaces each of the stators 52a and 52b, constituting the linear motor in FIG. 3.

For the distance L between the end surfaces of slider blocks, the overall length L0 of a stator block segment, and the distance Ld between the boundary surfaces, when Ld>L and (L0−Ld)>L, the linkage area between the boundary surface 65 and the magnetic path 62 can be reduced to one half. This theoretically reduces the rate of decrease in magnetic flux by half, and thus reduces the thrust ripple by half.

Further, when the stator constituting the linear motor in FIG. 8 is replaced by the stator 12 in FIG. 2, and for the distance L between the end surfaces of slider teeth, the overall length L0 of the stator block segment, and the distance Ld between the boundary surfaces, Ld>L and (L0−Ld)>L, the linkage area between the boundary surface 65 and the magnetic path 22 can be reduced by half. This theoretically reduces the rate of decrease in magnetic flux by half, and thus reduces the thrust ripple by half.

A detailed description will be given of Ld, L, L0, and the magnitude of the thrust ripple. (1) For Ld<L/3 and (L0−Ld)<L/3, the cross section of the boundary surface 65 where the magnetic paths 66 and 22 cross each other is the same as that obtained when the boundary surfaces are not displaced relative to one another between the stators. Consequently, displacing the boundary surfaces 65 relative to one another exerts no effect. The maximum amplitude of the thrust ripple is the same as that of the conventional linear motor. On the other hand, (2) for L>Ld>L/3 and L>(L0−Ld)>L/3, the magnetic paths 62 and 22 are partly formed so as not to cross the boundary surface 65. This reduces the decrease in the total amount of magnetic flux compared to the case (1) where the magnetic paths 62 and 22 completely cross the boundary surface 65. This in turn enables the maximum amplitude of the thrust ripple to be set lower than that of the conventional linear motor. Moreover, (3) for Ld>L and (L0−Ld)>L, the linkage cross section between the boundary surface 65 and the magnetic paths 62 and 22 is reduced by half. This reduces the maximum amplitude of the thrust ripple to as low as the half of that of the conventional linear motor.

Figure 2B:
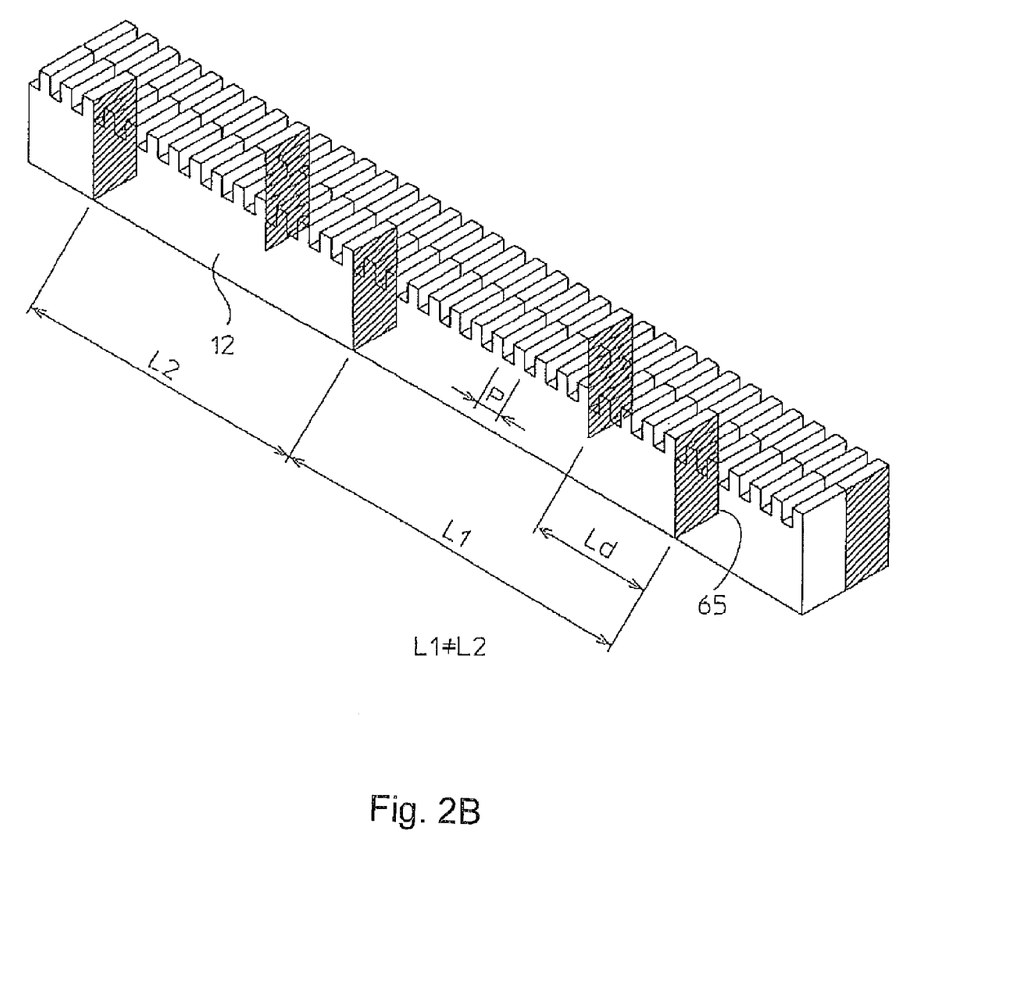
FIG. 2B shows an alternative diagram of a linear motor in accordance with a first embodiment.

FIG. 2B shows an alternative diagram of a linear motor in accordance with a first embodiment. Here, the stators are shown with stator blocks of different length L1 and L2, where L1≠L2.

In the first and second embodiments, a reduction of the thrust ripple based on displacement of the boundary surfaces 65 in the moving direction of the slider can be achieved even if individual stator blocks or stator block segments have different overall lengths. In this case, the distance, in the moving direction of the slider, between a combination of two of all the boundary surfaces formed between the stator blocks or stator block segments is defined as Ld. Then, as is the case with the above linear motor, (1) for Ld<L/3, displacing the boundary surfaces 65 relative to one another exerts no effect. (2) For L>Ld>L/3, the thrust ripple can be reduced. (3) For Ld>L, the maximum amplitude is reduced to as low as the half of that of the conventional linear motor.

What is claimed is:

1. A linear motor comprising:
   two stators each having projecting poles arranged on opposite surfaces thereof at predetermined intervals, the stators extending parallel to each other;
   three types of slider blocks acting as magnetic poles for three phases on the basis of AC windings for three phases; and
   an slider having permanent magnets arranged on two surfaces of each of the slider blocks which are opposite the two stators so as to provide alternate polarities, the slider being movable between the two stators along an extending direction of the stators,
   wherein the two stators each comprise a plurality of stator blocks arranged in the moving direction of the sliders so that the projecting poles are maintained at predetermined intervals,
   boundary surfaces are formed in adjacent stator blocks so as to be displaced relative to one another between the two opposite blocks by a distance Ld in the moving direction of the sliders, and
   when a distance between end surface of the slider blocks is defined as L and the overall length of one stator block is defined as L0, the components are arranged such that Ld>L/3 and (L0−Ld)>L/3.

2. A linear motor comprising:
   two stators each having projecting poles arranged on opposite surfaces thereof at predetermined intervals, the stators extending parallel to each other;
   three types of slider blocks acting as magnetic poles for three phases on the basis of AC windings for three phases; and
   an slider having permanent magnets arranged on two surfaces of each of the slider blocks which are opposite the two stators so as to provide alternate polarities, the slider being movable between the two stators along an extending direction of the stators,
   wherein the two stators each comprise a plurality of stator blocks arranged in the moving direction of the sliders so that the projecting poles are maintained at predetermined intervals,
   each of the stator blocks is further divided into two segments in a direction perpendicular to the moving direction of the sliders, and boundary surfaces formed in two adjacent stator block segments are displaced relative to one another between the adjacent segments by a distance Ld in the moving direction of the sliders, and
   when a distance between end surface of the slider blocks is defined as L and the overall length of one stator block segment is defined as L0, the components are arranged such that Ld>L/3 and (L0−Ld)>L/3.

3. A linear motor comprising:
   a stator having projecting poles arranged along a straight line at predetermined intervals;
   three types of slider teeth located opposite the projecting poles and acting as magnetic poles for three phases on the basis of AC windings for three phases; and
   an slider having permanent magnets arranged on a surface of each of the slider teeth which is opposite the stator so as to provide alternate polarities, the slider being movable along an extending direction of the stator,
   wherein the stator comprises a plurality of stator blocks arranged in the moving direction of the sliders so that the projecting poles are maintained at predetermined intervals,
   each of the stator blocks is further divided into two segments in a direction perpendicular to the moving direction of the sliders, and boundary surfaces formed in two adjacent stator block segments are displaced relative to one another between the adjacent segments by a distance Ld in the moving direction of the sliders, and
   when a distance between end surface of the slider blocks is defined as L and the overall length of one stator block segment is defined as L0, the components are arranged such that Ld>L/3 and (L0−Ld)>L/3.

4. The linear motor according to claim 1, wherein the linear motor preferably has relationships Ld>L and (L0−Ld)>L.

5. The linear motor according to claim 2, wherein the linear motor preferably has relationships Ld>L and (L0−Ld)>L.

6. The linear motor according to claim 3, wherein the linear motor preferably has relationships Ld>L and (L0−Ld)>L.

7. A linear motor comprising:

two stators each having projecting poles arranged on opposite surfaces thereof at predetermined intervals, the stators extending parallel to each other;

three types of slider blocks acting as magnetic poles for three phases on the basis of AC windings for three phases; and an slider having permanent magnets arranged on two surfaces of each of the slider blocks which are opposite the two stators so as to provide alternate polarities, the slider being movable between the two stators along an extending direction of the stators, wherein the two stators each comprise a plurality of stator blocks having different lengths and arranged in the moving direction of the sliders so that the projecting poles are maintained at predetermined intervals, and when a minimum value for a distance between boundary surfaces formed in stator blocks is defined as Ld and a distance between end surfaces of the slider blocks is defined as L, the components are arranged such that Ld>L/3.

8. A linear motor comprising:

two stators each having projecting poles arranged on opposite surfaces thereof at predetermined intervals, the stators extending parallel to each other;

three types of slider blocks acting as magnetic poles for three phases on the basis of AC windings for three phases; and an slider having permanent magnets arranged on two surfaces of each of the slider blocks which are opposite the two stators so as to provide alternate polarities, the slider being movable between the two stators along an extending direction of the stators, wherein the two stators each comprise a plurality of stator blocks arranged in the moving direction of the sliders so that the projecting poles are maintained at predetermined intervals, each of the stator blocks is further divided into two segments in a direction perpendicular to the moving direction of the sliders, and the two stator block segments have different lengths, and when a minimum value for a distance between boundary surfaces formed in stator blocks is defined as Ld and a distance between end surfaces of the slider blocks is defined as L, the components are arranged such that Ld>L/3.

9. A linear motor comprising:

a stator having projecting poles arranged along a straight line at predetermined intervals;

three types of slider teeth located opposite the projecting poles and acting as magnetic poles for three phases on the basis of AC windings for three phases; and an slider having permanent magnets arranged on a surface of each of the slider teeth which is opposite the stator so as to provide alternate polarities, the slider being movable along an extending direction of the stator, the stator comprises a plurality of stator blocks arranged in the moving direction of the sliders so that the projecting poles are maintained at predetermined intervals, each of the stator blocks is further divided into two segments in a direction perpendicular to the moving direction of the sliders, and the two stator block segments have different lengths and when a minimum value for a distance between boundary surfaces formed in stator blocks is defined as Ld and a distance between end surfaces of the slider blocks is defined as L, the components are arranged such that Ld>L/3.

10. The linear motor according to claim 7, wherein the linear motor has a relationship Ld>L.

11. The linear motor according to claim 8, wherein the linear motor has a relationship Ld>L.

12. The linear motor according to claim 9, wherein the linear motor has a relationship Ld>L.

* * * * *

UNITED STATES PATENT AND TRADEMARK OFFICE
CERTIFICATE OF CORRECTION

| | | |
|---|---|---|
| PATENT NO. | : 7,839,029 B2 | Page 1 of 1 |
| APPLICATION NO. | : 11/749337 | |
| DATED | : November 23, 2010 | |
| INVENTOR(S) | : Miyaji et al. | |

It is certified that error appears in the above-identified patent and that said Letters Patent is hereby corrected as shown below:

Title Page item 12
Please correct the spelling of the first inventor's last name on the cover page of the issued patent:

Masashi Miyaji

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

PATENT NO.         : 7,839,029 B2
APPLICATION NO.    : 11/749337
DATED              : November 23, 2010
INVENTOR(S)        : Miyaji et al.

It is certified that error appears in the above-identified patent and that said Letters Patent is hereby corrected as shown below:

Title Page item 12 and item (75) Inventors,
    Please correct the spelling of the first inventor's last name on the cover page of the issued patent:

Masashi Miyaji

This certificate supersedes the Certificate of Correction issued February 3, 2011.

Signed and Sealed this
First Day of March, 2011

David J. Kappos
*Director of the United States Patent and Trademark Office*